United States Patent [19]

Madigan et al.

[11] Patent Number: 5,307,760
[45] Date of Patent: May 3, 1994

[54] METHOD OF RECYCLING LIQUIFIED GAS TANKS AND ANIMAL FEEDER MADE THEREBY

[75] Inventors: Brad A. Madigan; Susan M. Madigan, both of Dane; Charles A. Curwick, Beaver Dam, all of Wis.

[73] Assignee: Bradigan Wildlife Feeds, Inc., Dane, Wis.

[21] Appl. No.: 883,588

[22] Filed: May 13, 1992

[51] Int. Cl.$^5$ .............................................. A01K 5/00
[52] U.S. Cl. .................................... 119/52.3; 119/54; 119/57.9
[58] Field of Search ................. 119/54, 53.5, 52.2, 119/52.3, 57.8, 57.9, 70, 51.04, 57.91

[56] References Cited

U.S. PATENT DOCUMENTS

| | | |
|---|---|---|
| 251,021 | 2/1979 | Blasbalg . |
| 268,619 | 4/1983 | Blasbalg . |
| 269,300 | 6/1983 | Blasbalg . |
| 1,112,068 | 9/1914 | Keller ................... 119/70 |
| 1,199,655 | 9/1916 | Battle .................... 119/54 |
| 1,217,438 | 2/1917 | Gallagher .............. 119/70 |
| 1,253,002 | 1/1918 | Collins ................... 119/70 |
| 1 367,971 | 2/1921 | Hunnicutt ............. 119/53.5 |
| 2,277,420 | 3/1942 | Stanfield ............... 119/57.8 |
| 2,972,334 | 2/1961 | Braden . |
| 3,040,705 | 6/1962 | Schlitz ................. 119/52.2 |
| 3,515,098 | 6/1970 | Thurmond . |
| 3,568,641 | 3/1969 | Kilham . |
| 3,677,230 | 7/1972 | Braden . |
| 3,730,142 | 5/1973 | Kahrs et al. . |
| 3,741,163 | 6/1973 | Bush . |
| 3,780,701 | 12/1973 | Wentworth . |
| 4,102,308 | 7/1978 | Kilham ................. 119/52.2 |
| 4,270,489 | 6/1981 | Joronen . |
| 4,355,597 | 10/1982 | Blasbalg . |
| 4,356,793 | 11/1982 | Blasbalg . |
| 4,712,512 | 12/1987 | Schreib et al. ....... 119/52.2 |
| 4,829,934 | 5/1989 | Blasbalg . |
| 4,945,859 | 8/1990 | Churchwell .......... 119/54 |
| 5,063,877 | 11/1991 | Riggi .................... 119/52.2 |
| 5,085,173 | 2/1992 | Powers . |

*Primary Examiner*—Gene Mancene
*Assistant Examiner*—Todd E. Manahan
*Attorney, Agent, or Firm*—Stroud, Stroud, Willink, Thompson & Howard

[57] ABSTRACT

A method of recycling refrigerant or the like tanks to construct animal feeders. The animal feeders include the tanks as feed hoppers and provide a feeding dispensing mechanism which permits adjusting the amount of feed dispensed from the hopper. The tanks can also be recycled by making guards for the animal feeders to prevent small animals such as squirrels or the like from gaining access to feed in the feeders.

23 Claims, 5 Drawing Sheets

METHOD OF RECYCLING LIQUIFIED GAS TANKS AND ANIMAL FEEDER MADE THEREBY

TECHNICAL FIELD

The invention relates generally to waste recycling methods, and specifically to a method of recycling used containers, namely, liquified gas, such as refrigerant tanks, to construct animal feeders. The novel animal feeders are especially well suited as self-feeding devices for virtually any kind of animal from birds to deer.

BACKGROUND OF THE INVENTION

Disposal and waste management of used containers for goods and chemicals have become important problems today. Most waste management programs are directed to essentially chemical processes which treat, e.g., sterilize, a used container to make it suitable for ultimate disposal in a landfill, melt or reprocess the material of the containers so that new containers or the like can be made from the old, or simply incinerate the container. Few, if any, approaches to waste management are directed to reuse of the container "as is" for another use or use of components or parts of the container for another use.

In the United States alone, it is estimated, for example, that about 10-16 million Freon TM or other refrigerant tanks are used and disposed of annually. While such tanks do not require any sterilization or other sanitizing treatment, they often contain, perhaps, one to two pounds of refrigerant remaining in the tank which must be removed prior to disposal in a landfill. It would be especially desirable to find a use for these and similar tanks, which has a low energy requirement, utilizes the remaining gas, e.g., refrigerant, and produces a novel product.

SUMMARY OF THE INVENTION

The present invention provides a method for reusing products of a huge waste disposal problem, namely, used liquified gas, e.g., refrigerant, tanks, to construct a novel animal feeder. The refrigerant or the like tanks are of the type having a cylindrical midportion, substantially conical top and bottom portions, a top valve having a valve handle, a valve stem, a valve shaft, and a valve outlet, and handles secured to the top portion. The method includes cutting a discharge opening of predetermined size in the bottom of a refrigerant or the like tank, and securing one end of a sleeve having a bore therethrough to the discharge opening. The bore is aligned with and is sized substantially the same as or smaller than the discharge opening. A hole is cut adjacent the shaft through the top portion of the tank. One end of a predetermined length of wire or the like is secured to one end of a rod. The rod has substantially the length of the tank and can be disposed inside the tank for filling and transporting. The other end of the wire is then passed through the hole in the top portion. To secure the wire, several revolutions of wire, for example, can then be wound about the valve shaft, thereby adjusting the length of and holding fast the wire. Finally, the sleeve is covered with a removable closure cap.

The animal feeder of the present invention includes features which are heretofore not described in the prior animal feeder art. The animal feeder includes a feed hopper having a cylindrical sidewall, substantially conical top and bottom portions, a bottom discharge opening of predetermined size, and a suspender secured to the top conical portion of the hopper for suspending the hopper from a tree limb or the like. The discharge opening includes a removable closure cap for closing the discharge opening, and a closure cap-receiving sleeve adjacent the discharge opening having a bore extending therethrough. The bore of the sleeve is aligned with and is sized substantially the same as or smaller than the discharge opening. The feeder also includes a dispensing mechanism which includes a rod extendably secured interiorly to the top portion of the hopper for extending axially through the discharge opening of the hopper when the closer cap is removed. The rod is of a relatively smaller dimension in width than the width of the discharge opening and/or the sleeve opening, permitting sideward movement of the rod when extended through the discharge opening.

The feeder of the invention may further include a scenter which contains an animal attractant and/or a feed collector or both. The scenter is removably secured to the end of the rod extending beyond the bottom of the hopper. The feed collector is removably secured to the end of the rod extending beyond the bottom of the hopper, or is removably secured to the scenter.

In another aspect, the invention provides an improved bird feeder of the type which includes a vertically disposed hollow housing including an open top, a peripheral sidewall, a bottom wall, an aperture in the sidewall, and a perch extending outward from the sidewall below said aperture wherein the improvement includes a feed hopper operatively associated with the housing for storing and dispensing a reservoir of feed. The feed hopper includes a cylindrical sidewall, substantially conical top and bottom portions, a bottom discharge opening of predetermined size and a suspender secured to the top conical portion for suspending said hopper from a tree limb or the like. The discharge opening includes a removable closure cap for closing the discharge opening and a closure cap-receiving sleeve adjacent the discharge opening having a bore extending therethrough. The bore is sized to receive the top of the feeder such that when the closure cap is removed, the top of the housing is removably secured to the sleeve.

In still another aspect, the invention is a method of feeding animal which includes filling with feed an animal feeder as described hereinabove, extending a portion of the rod through the discharge opening beyond the bottom of the hopper and leaving a remaining portion within the hopper, and hanging the hopper by its suspenders from a tree limb or the like, such that when the rod is moved, feed in the hopper will discharge through the discharge opening. The amount of feed dispensed can be adjusted by varying the width of the rod compared to the width of the discharge opening or varying the portion of rod extending beyond the hopper.

The refrigerant or the like tanks of the type described herein can also be cut circumferentially about the bottom portion from the tank to form a conical dome which can serve as a guard for an animal feeder to prevent squirrels or the like from gaining access to feed in the feeder. This constitutes another aspect of the invention.

The invention advantageously provides a recycling method in which used tanks are used essentially "as is"

without further chemical processing or rendering. The novel animal feeder produced by the method of the invention advantageous includes a top portion which is a built-in "squirrel guard" and the dispensing mechanism permits adjusting the amount of feed dispensed.

These and other advantages and a fuller appreciation of the specific attributes of this invention will be gained upon an examination of the following drawings, detailed description of preferred embodiments, and appended claims. It is expressly understood that the drawings are for the purpose of illustration and description only, and are not intended as a definition of the limits of the invention.

BRIEF DESCRIPTION OF THE DRAWINGS

The preferred exemplary embodiment of the present invention will hereinafter be described in conjunction with the appended drawing wherein like designations refer to like elements throughout and in which.

DETAILED DESCRIPTION

The present invention relates broadly to waste recycling methods. However, the method of the present invention is most particularly adapted for use in the recycling and reuse of used containers. Accordingly, the present invention will now be described in detail with respect to such endeavors; however, those skilled in the art will appreciate that such a description of the invention is meant to be exemplary only and should not be viewed as limitative on the full scope thereof.

The present invention provides a method for recycling used liquified gas, e.g., refrigerant such as Freon TM or the like, tanks. The present invention is characterized by an ability to reuse such tanks without chemically rendering the metal of the tanks. The products formed by the method are in themselves novel, namely a universal animal feeder suitable for birds, squirrels, rabbits, deer and domesticated animals. The feeders are simple and economical to construct, rugged and sturdy; they provide a large feed reservoir capacity, are readily portable without feed spillage, and permit adjusting the amount of feed dispensed. These attributes are achieved through a novel combination of physical features.

It is noted that many animal and bird feeders are known and commercially available. For example, for wildlife feeders, see U.S. Pat. No 5,085,173 issued to Powers, U.S. Pat. No. 3,789,701 issued to Wentworth, Sr., U.S. Pat. No. 3,515,098 issued to Thurmond, and U.S. Pat. No. 2,972,334 issued to Braden. For bird feeders, see, for example, U.S. Pat. Nos. 4,829,934; 4,356,793; and 4,355,597, all issued to Blasbalg, and U.S. Pat. No. 3,568,641 issued to Kilham; see, also, U.S. Pat. Nos. 269,300; 268619; 251,021, all issued to Blasbalg. For fish feeders, see, for example, U S. Pat. No. 3,677,230 issued to Braden, U.S. Pat. No. 3,730,142 issued to Kahrs et al., U.S. Pat. No. 3,741,163 issued to Bush, and U.S. Pat. No. 4,270,489 issued to Joronen. The aforementioned wildlife and fish feeder patents disclose various kinds of feed dispensing mechanisms, all of which involve the use of a rod depending from a feed reservoir.

Figure 1:
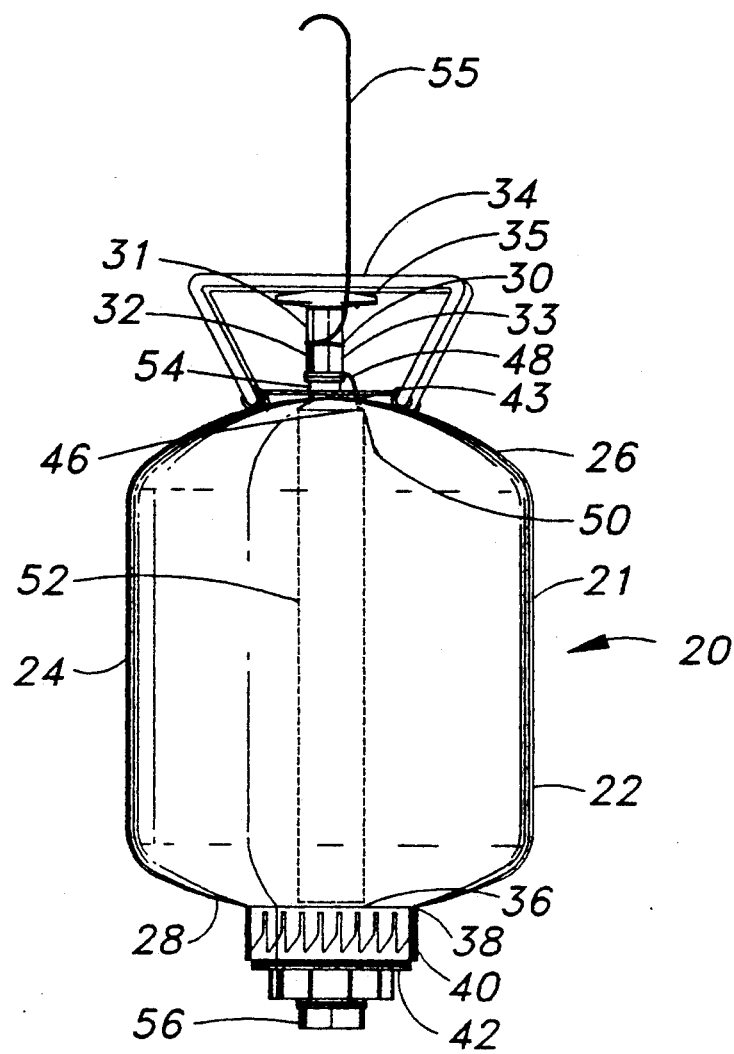
FIG. 1 is a side elevational view of animal feeder of the invention in the storage position.
Figure 1A:
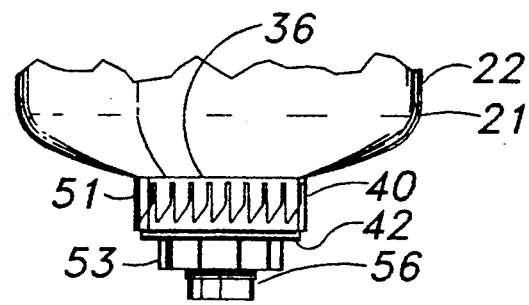
FIG. 1A is a partial side view of the animal feeder of FIG. 1 illustrating downsizing of the discharge opening.
Figure 2:
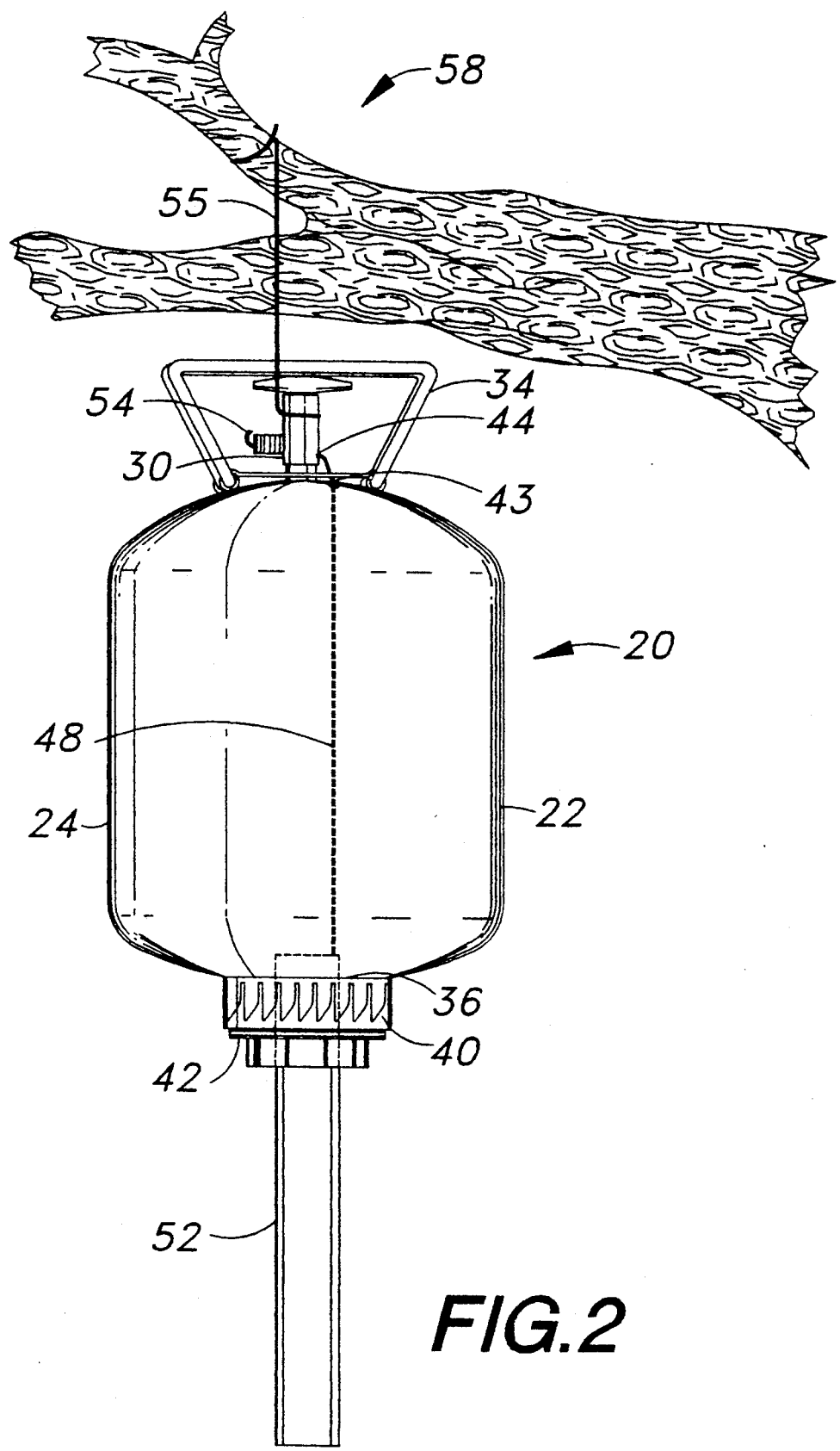
FIG. 2 is a side elevational view of the animal feeder of the invention in a use position.

In one of its aspects, the invention is a method of recycling liquified gas, e.g., Freon TM or the like, tanks. Reference is initially made to FIGS. 1, 1A, and 2 depicting an animal feeder made in accordance with the method of the invention. The feeder 20 is formed from a refrigerant tank 21 and the tank serves as a feed hopper 22. Tank 21 has a cylindrical midportion or sidewall 24, substantially conical top and bottom portions 26 and 28, respectively, a top valve 30 having a shaft 31, an outlet 32, a valve stem 33 and a handle 35, and top suspenders or handles 34 secured to the top portion 26.

The tanks 21 are found in various sizes, typically 30 or 50 pound tanks, and are constructed of 10–26 gauge metal, e.g., aluminum, and are substantially dent resistant. A 30 pound tank is typically about 14 inches in length and about 30 inches in circumference about sidewall 24. A 50 pound tank is about 14¼ inches in length and about 38 inches in circumference about sidewall 24. When ready for disposal in landfills, the tanks 21 typically still contain about ½ to about 1 pound of refrigerant remaining in the tank. Because of environmental concerns regarding the atmospheric ozone layer, governmental regulations permit neither disposal in landfills with the refrigerant (or other liquified gas) remaining in the tank nor venting the remaining refrigerant to the atmosphere. Thus, a first step of the method of the invention is venting the remaining refrigerant into a recovery system so that the refrigerant itself can be reused for refrigeration or heat exchange. For liquified gases other than refrigerants, other recovery systems apply.

A discharge opening 36 of predetermined size then is cut into the bottom 28 of tank 21. Such cutting may be accomplished by any known means, such as by mechanical punch or a hole saw. A sleeve 40 having a bore 42 therethrough which is sized substantially the same as or smaller in width as discharge opening 36 is aligned with the discharge opening 36 and one end 38 of sleeve 40 is then secured to the rim of discharge opening 36. A hole 43 is then cut adjacent valve 30 in top portion 26. A hole 44 is cut then opposite outlet 32 through the shaft 31 of the valve 30.

A dispensing mechanism is provided by a tube, bar or rod 52 and a connector such as cord, cable, rope or wire 48. One end 46 of a predetermined length of wire 48 is secured to one end 50 of rod 52. The other end 54 of wire 48 is passed through the hole 43 of top portion 26, and then through hole 44 of shaft 31 of valve 30 and out outlet 32 of valve 30. The wire is pulled through hole 44 and outlet 32 to any desired length. The handle 35 of valve is then turned so that the valve stem 33 inserts into shaft 31 and holds wire 48 fast. Alternatively, end 54 of wire 48 may be passed through hole 43 of top portion 26 and several revolutions of wire 48 wound about shaft 31 to hold wire 48 fast.

Rod 52 is approximately the same length as the vertical length of tank 21 or alternatively, is the length of tank 21 plus sleeve 40. For storage and carrying purposes, rod 52 is disposed inside of tank 21 and sleeve 40 and sleeve 40 is covered with a removable closure cap 56. Closure cap 56 may be removably secured to sleeve 40 by, for example, sleeve 40 having an internal screw thread and a closure cap being complementarily threaded to sleeve 40. Top handles 34 are configured for carrying tank 21 and for hanging tank 21 from a tree limb 58 or the like although a hook 55 can also be attached to valve 30 for hanging tank 21. Rod 52, sleeve 40 and cap 56 are suitably constructed of a polyvinylchloride or similar polymeric material.

Alternatively, sleeve 40 is conveniently a interiorly threaded slip ring 51 and a half union 53 of a 2-inch conventional plumbing union. Cap 56 is conveniently a 2-inch pipe thread cap. The use of such commercially available unions which serve as sleeve and cap permits an economy of production of the feeder.

To use the animal feeder 20 of the invention, the hopper 22 is filled with an animal feed with rod 52 disposed inside hopper 22. It is noted that sleeve 40 acts as a funnel for filling the hopper 22. Cap 56 is secured to sleeve 40 and the animal feeder 20 is carried or transported to any location without dropping or losing any feed from the hopper 22. The hopper 22 is hung from a tree limb 58 or the like by, for example, handles 34 (FIG. 8) or a hook 55 attached to valve 30 (see FIGS. 1 and 2). Cap 56 is removed and a portion of rod 52 is extended through discharge opening 36 and sleeve bore 42 so that it extends beyond the bottom 28 of hopper 22. The length of wire 48 is such that when rod 52 is extended below opening 36, a portion of rod 52 remains above discharge opening 36 within hopper 22.

Rod 52 is sized of a relatively smaller dimension in width than the width of bore 42 and opening 36, permitting sideward movement of the rod 52 when extended. For example, opening 36 is suitably about 3 inches in diameter and rod 52 is about 1⅜ inches in diameter. If a 2-inch half union adaptor is used in sleeve 40 as described hereinbefore, rod 52 is conveniently about 1 to about 1¼ inches in width (or diameter, if rod 52 is cylindrical). When rod 52 is moved, it agitates feed in hopper 22 and feed is discharged through discharge opening 36 and sleeve bore 42. It is noted that amount of feed discharged due to movement of rod 52 or simply by gravity is dependent upon the size of the feed particulates (not shown), the size of rod 52, and the length of rod 52 which extends beyond the bottom of hopper 22. For feeds which are primarily corn, and a 2-inch opening 36 (or alternatively, a 2-inch opening formed with sleeve 40 having a 2-inch half union) rod 52 is suitably about 1¼ inches in width. Generally, as the size (width compared to diameter of opening 36 and sleeve 40) of rod 52 increases, the amount of feed dispensed decreases, and as the length of rod 52 extending beyond hopper 22 increases, the amount of feed dispensed increases. As the size of the feed particulates increases, the amount of feed dispensed decreases.

It is also noted that top portion 26 being substantially conical acts as a guard against small animals such as squirrels and the like gaining access to the feed by a route from the top of the feeder.

Figure 3:
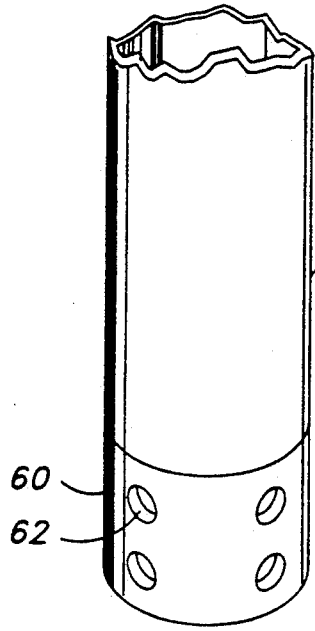
FIG. 3 is a side elevational view of the dispenser rod of the animal feeder of the invention with an attached scenter.
Figure 4:
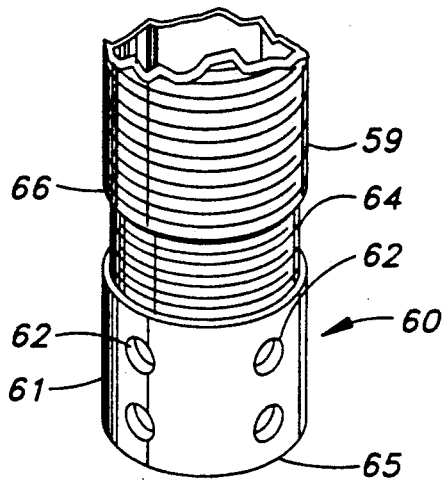
FIG. 4 is a side elevational view of a scenter.

Although feed is readily dispensed from hopper 22 by movement of rod 52 and/or simply by gravity, it has been found that many wild animals such as deer will not simply go up to rod 52 and move it. Animals including deer can be induced to move rod 52 by attaching to other end 59 of rod 52 a scenter 60, as seen in FIG. 3, which contains an animal attractant. The attractant used will depend upon the animal desired to attract. Referring now to FIG. 4, scenter 60 is preferably a cup-shaped with a sidewall 61, a bottom 65 and one or more apertures 62 in sidewall 61 and is suitably constructed of polyvinylchloride or similar polymeric material. Scenter 60 suitably, for example, has an externally threaded top 64, and end 59 of rod 52 is provided with internal threads 66 to receive top 64 of scenter 60. Other methods of securing scenter 60 are also contemplated and can be used. Many animal attractants are known and commercially available. Many attractants are typically liquids and can be placed in scenter 60, for example, by wetting a cotton or the like swab (not shown) and placing the wetted swab in scenter 60. The attractant odor emerges from apertures 62, thus attracting the animal to rod 52.

Figure 5:
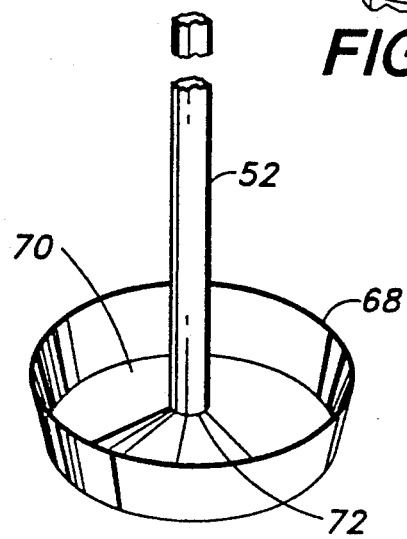
FIG. 5 is a side elevational view of the dispenser rod of the animal feeder of the invention with an attached feed collector.

In another aspect, the animal feeder 20 made by the method of the invention is provided with a feed collector, bowl or dish 68 as shown in FIG. 5. Feed collector 68 has bottom 70 and a centrally located hole 72 therethrough and is suitably constructed of polyvinylchloride or similar polymeric material. Feed collector 68 is suitably removably attached to end 59 of rod 52 by any of a number of attachment methods, for example, end 59 of rod 52 may be externally threaded and hole 72 may be internally threaded to receive end 59. Feed collector 68 is especially useful if bird feeding is desired. Feed collector 68 may be sized to attract different size birds; for example, a larger diameter collector will attract larger birds. Collector 68 may also, however, be used in feeding larger animals, for example, deer. Feed collector 68 is an adjustable collector because, as described hereinbefore, the amount of feed in feed collector 68 can be regulated by the size of rod 52, the length it extends beyond hopper 22 and the size of the feed particulates used.

Figure 7:
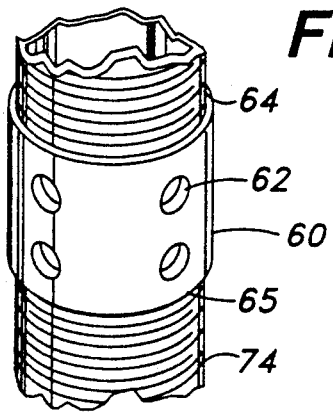
FIG. 7 is a side elevational view of a scenter for use with a feed collector in accordance with the present invention.
Figure 6:
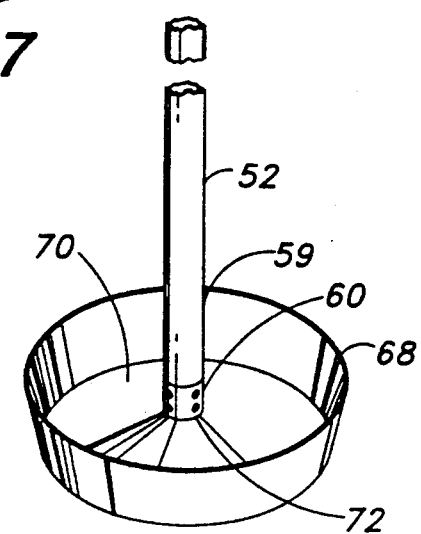
FIG. 6 is a side elevational view of the dispenser rod of the animal feeder of the invention with an attached feed collector and scenter.

Collector 68 can also be combined with scenter 60 as seen in FIG. 6. Referring to FIG. 7, in this embodiment of the invention, scenter 60 has, for example, a threaded top 64 and a threaded bottom 74 with closed bottom 65 to receive a portion of attractant. Top 64 is threadedly received by end 59 of rod 52 while hole 72 receives bottom 74.

Figure 8:
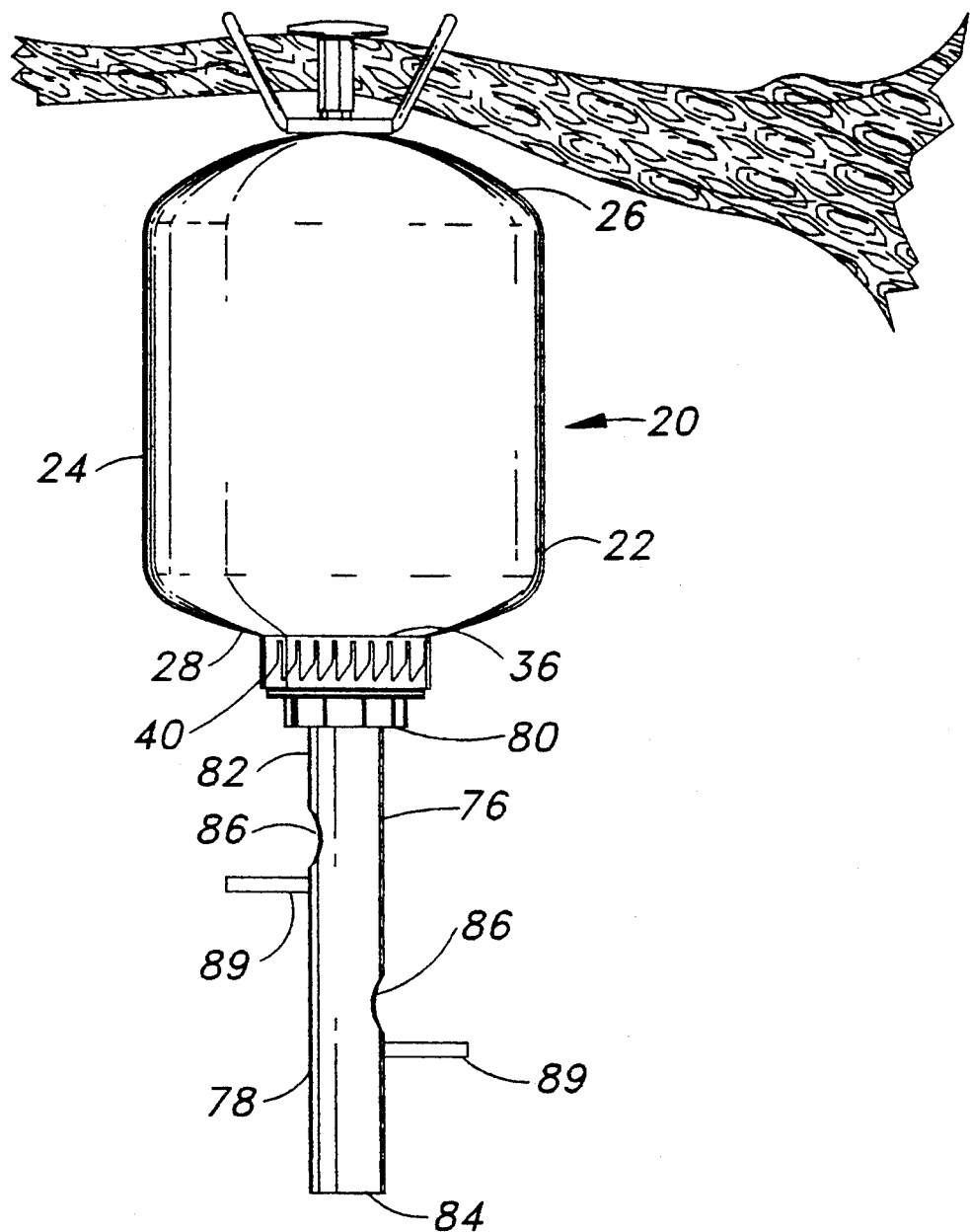
FIG. 8 is a side elevational view of another embodiment of the invention adapted for feeding birds.

In yet another aspect of the invention, hopper 22 is used in combination with a conventional bird feeder to provide an improved bird feeder. As seen in FIG. 8, hopper 22 is constructed as described hereinabove. Bird feeder 76 includes a vertically disposed hollow housing 78 having an open top 80, a peripheral sidewall 82, a bottom wall 84, at least one aperture 86 in sidewall 82, and a perch 89 extending outward from sidewall 82 below aperture 86. Sleeve 40 of hopper 22 is sized to fit removably over top end 80 of housing 78 by, for example, threaded fitting into bore 42 of sleeve 40. Feed hopper 22 is thus operatively associated with conventional bird feeder for storing and dispensing a reservoir of feed.

Figure 9:
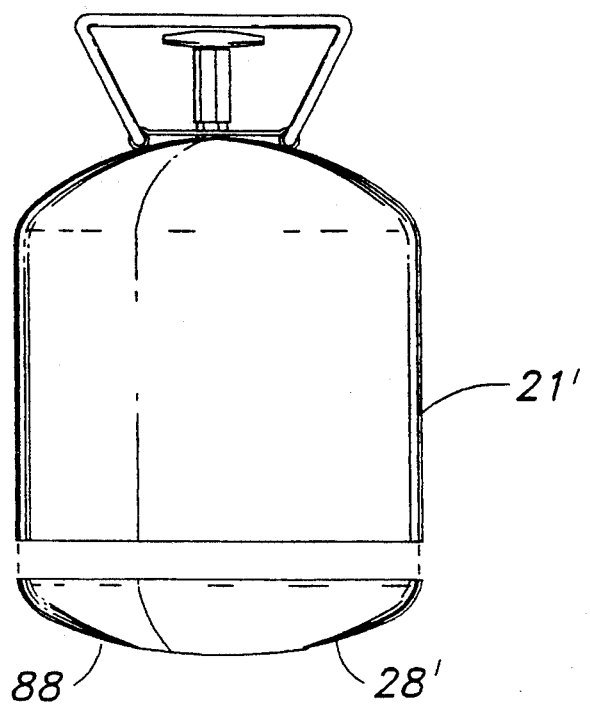
FIG. 9 illustrates forming a guard from a refrigerant tank in accordance with the present invention.
Figure 10:
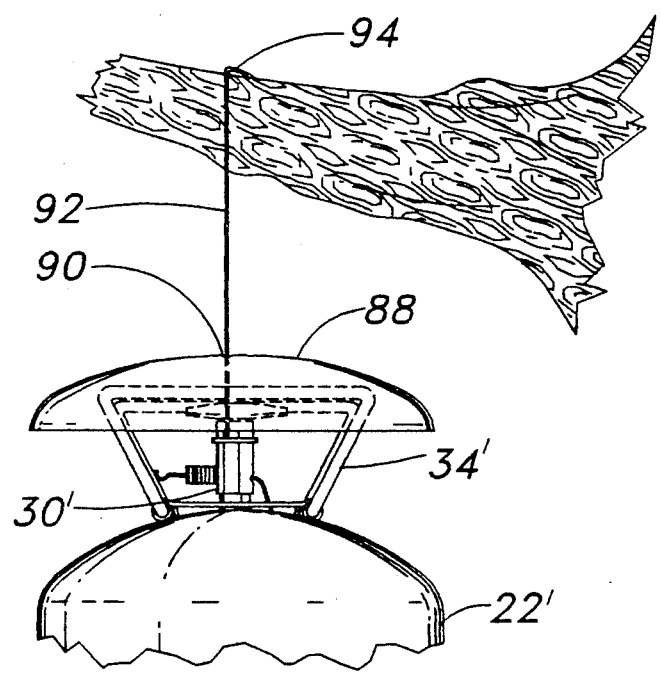
FIG. 10 illustrates the use of the guard of FIG. 9 with a cutaway section illustrating the attachment to the feeder.

As described hereinbefore, top portion 26 of feeder 20 serves as a "squirrel" guard as squirrels and other small animals unable to negotiate the conical slope of top portion 26. However, the feeder of the invention or any other feeder can be provided with an external guard to prevent squirrels and the like from getting the feed. This guard is suitably formed from tank 21. As seen in FIGS. 9 and 10, to form a guard 88, the 28' of a tank 21' can be cut away circumferentially to form a dome-shaped, substantially conical guard. A hole 90 is also cut in the center of guard 88. In use, a wire 92 or the like is attached to a hook 94 which hooks about valve 30' and strung through hole 90 so that guard 88 rests on handles 34'. The guard so made and the method of making the guard comprise additional aspects of the invention.

In summary, the present invention provides a method for reusing the millions of liquified gas, e.g., refrigerants such as Freon TM or the like, tanks which are disposed of annually in the United States alone to construct a simple, rugged universal animal feeder. The feed dispensing mechanism of the feeder is such that the amount of feed dispensed is adjustable. The dispensing mechanism can be entirely contained within the hopper and the hopper closed so that it may be transported with feed to any location. The feeder in several embodiments can have a scenter to attract animals or a feed collector or both. It may also be used in combination with a conventional bird feeder.

While the present invention has now been described and exemplified with some specificity, those skilled in the art will appreciate the various modifications, including variations, additions, and omissions, that may be made in what has been described. Accordingly, it is intended that these modifications also be encompassed by the present invention and that the scope of the present invention be limited solely by the broadest interpretation that lawfully can be accorded the appended claims.

We claim:

1. A method of recycling liquified gas tanks of the type having a cylindrical midportion, substantially conical top and bottom portions, a top valve having a valve shaft, and handles secured to the top portion, said method comprising:
   cutting a discharge opening of predetermined size in the bottom portion of a liquified gas tank,
   securing one end of a sleeve having a bore therethrough to said discharge opening, said bore being sized substantially the same as and aligned with said discharge opening,
   cutting a hole in the top portion of the tank adjacent the valve shaft,
   securing one end of a predetermined length of wire to one end of a rod, said rod having substantially the length of the tank,
   disposing said rod inside the tank,
   passing the other end of said length of wire through said hole in said top portion,
   winding several revolutions of wire about the valve shaft, and
   removably covering said sleeve with a closer cap.

2. The method of claim 1, wherein the liquified gas is a refrigerant and the method further comprising venting refrigerant in the tank to a refrigerant recovery system.

3. The method of claim 1, wherein the valve further includes a valve handle, a valve stem, and a valve outlet, and the method further comprising cutting a hole through the valve shaft opposite the valve outlet, said hole being aligned with the valve outlet, passing said other end of said length of wire through said hold in the valve shaft and out through the valve outlet, and turning the valve handle to insert the valve stem into the valve shaft, contacting and holding fast said length of wire.

4. An animal feeder, comprising:
   a feed hopper having a vertical cylindrical sidewall, substantially conical top and bottom portions, and a bottom discharge opening of predetermined size; said discharge opening including a removable closure cap for closing said discharge opening and a closure cap-receiving sleeve adjacent said discharge opening having a bore extending therethrough, said bore being sized substantially the same as and in alignment with said discharge opening;
   a rod extendably secured interiorly to said top portion of said hopper for extending axially through said discharge opening of said hopper when said closure cap is removed, said rod being of a relatively smaller dimension in width than the width of said discharge opening, permitting sideward movement of said rod when extended through said discharge opening, said rod having a length dimension substantially the same as the vertical length of said hopper, such that said rod can be entirely contained within said feed hopper when said feed hopper discharge opening is closed by said closure cap so that said feed hopper may be transported with feed to any location; and
   a suspender secured exteriorly to said top conical portion of said hopper for suspending said hopper from a support arm.

5. The animal feeder of claim 4, further comprising a scenter removably secured to the end of said rod extending beyond the bottom of said hopper.

6. The animal feeder of claim 5, further comprising a feed collector removably secured to said scenter.

7. The animal feeder of claim 4, further comprising a feed collector removably secured to the end of said rod extending beyond the bottom of said hopper.

8. The animal feeder of claim 4, further comprising a small animal guard secured above the feeder to prevent small animals from gaining access to feed in the feeder, said guard formed by cutting circumferentially off a bottom conical portion of a liquified gas tank to form a dome.

9. A method of feeding animal, comprising:
   filling with feed an animal feeder including (i) a feed hopper having top and bottom portions substantially conical; and (ii) a bottom discharge opening of predetermined size; said discharge opening including a sleeve having an internal screw thread and a complementarily threaded closer cap, said sleeve receiving said closer cap; (iii) a rod extendably secured interiorly of said hopper to said top of said hopper and axially extendable through said discharge opening of said hopper, said rod having a smaller dimension in width than the width of said discharge opening, permitting sideward movement of said rod; and (iv) handles secured to the exterior of said top portion of said hopper;
   extending a portion of said rod through said discharge opening beyond the bottom of said hopper and leaving a remainder portion within said hopper; and hanging said hopper by said handles from a support arm, such that when said rod is moved, feed will in said hopper discharge through said discharge opening.

10. The method of claim 9, further comprising adjusting said portion of said rod extending beyond the bottom of said hopper to meter an amount of feed to be dispensed.

11. The method of claim 9, wherein said rod includes a feed collector attached to one end of said rod extending beyond said bottom of said hopper, and further comprises collecting feed in said feed collector.

12. The method of claim 9, further comprising securing a removable scenter to the end of said rod extending beyond the bottom of said hopper.

13. The method of claim 12, further comprising removably securing a feed collector to said scenter.

14. The method of claim 9, further comprising removably securing a feed collector to the end of said rod extending beyond the bottom of said hopper.

15. In a bird feeder of the type which includes a vertically disposed hollow housing including an open top, a peripheral sidewall, a bottom wall, an aperture in said sidewall, and a perch extending outward from said sidewall below said aperture, the improvement comprising a feed hopper operatively associated with said housing for storing and dispensing a reservoir of feed, said feed hopper including a cylindrical sidewall, substantially conical top and bottom portions, and a bottom discharge opening of predetermined size; a suspender secured to said top conical portion for suspending said hopper from a support arm; said discharge opening including a removable closure cap for closing said discharge opening and a closure cap-receiving sleeve adjacent said discharge opening having a bore extending therethrough, said bore being sized to receive the top of the feeder wherein when said closure cap is removed, the top of said housing is removably secured to said sleeve.

16. The bird feeder of claim 15, further comprising a small animal guard secured above the feeder to prevent small animals from gaining access to feed in the feeder, said guard formed from cutting circumferentially off a bottom conical portion of a liquified gas tank to form a dome.

17. A method of feeding animals, comprising:
cutting a hole of predetermined diameter in the bottom of a liquified gas tank of the type having a cylindrical midportion, substantially conical top and bottom portions, a top valve having a valve shaft, a valve handle, a valve outlet and a valve stem, and top handles attached to the exterior of said top portion, superposing over said hole a sleeve having a diameter aligned with the diameter of said hole and securing said sleeve to the bottom of the tank, cutting a hole in the top portion of the tank adjacent the valve shaft, securing one end of a predetermined length of wire to one end of a rod, said rod having substantially the length of said tank, disposing said rod inside the tank, cutting a hole through the valve shaft opposite the valve outlet, said hole being aligned with the valve outlet, passing said other end of said length of wire through said hole in the shaft and out through the valve outlet, turning the valve handle to insert the valve stem into the valve shaft, contacting and holding fast said length of wire, filling said hopper with feed through the discharge opening, covering said sleeve opening with a closure cap, hanging said hopper by said top handles said tank on a support arm, removing said closure cap, and extending a portion of said rod through said discharge opening beyond the bottom of said hopper.

18. Method of recycling liquified gas tanks of the type having a cylindrical sidewall and substantially conical top and bottom portions, comprising the steps of cutting circumferentially the bottom portion from the liquified gas tank to form a dome, and securing said dome above an animal feeder to prevent small animals from gaining access to feed in the feeder.

19. An animal feeder constructed by cutting a hole of predetermined diameter in the bottom of a first liquified gas tank of the type having a cylindrical midportion, substantially conical top and bottom portions, a top valve having a valve shaft, a valve handle, a valve outlet and a valve stem, and top handles attached to the exterior of said top portion, superposing over said hole a sleeve having a diameter aligned with the diameter of said hole and securing said sleeve to the bottom of the tank, cutting a hole in the top portion of the tank adjacent the valve shaft, securing one end of a predetermined length of wire to one end of a rod, said rod having substantially the length of said tank, disposing said rod inside the tank, cutting a hole through the valve shaft opposite the valve outlet, said hole being aligned with the valve outlet, passing said other end of said length of wire through said hole in the shaft and out through the valve outlet, turning the valve handle to insert the valve stem into the valve shaft, contacting and holding fast said length of wire, filling said hopper with feed through the discharge opening, covering said sleeve opening with a closure cap, hanging said hopper by said top handles said tank on a support arm, removing said closure cap, and extending a portion of said rod through said discharge opening beyond the bottom of said hopper.

20. The animal feeder of claim 19, further comprising a scenter removably secured to the end of said rod extending beyond the bottom of said hopper.

21. The animal feeder of claim 19, further comprising a feed collector removably secured to the end of said rod extending beyond the bottom of said hopper.

22. The animal feeder of claim 20, further comprising a feed collector removably secured to the end of said rod extending beyond the bottom of said hopper.

23. The animal feeder of claim 19, further comprising a bottom conical circumferentially cut portion of a second liquified gas tank, said bottom conical portion forming a dome, said dome secured above the feeder to prevent small animals from gaining access to feed in the feeder.

* * * * *